Nov. 19, 1963                H. C. CUSKIE                3,111,307
                      INDEPENDENT SUSPENSION SYSTEM
Filed Nov. 21, 1960                                3 Sheets-Sheet 3

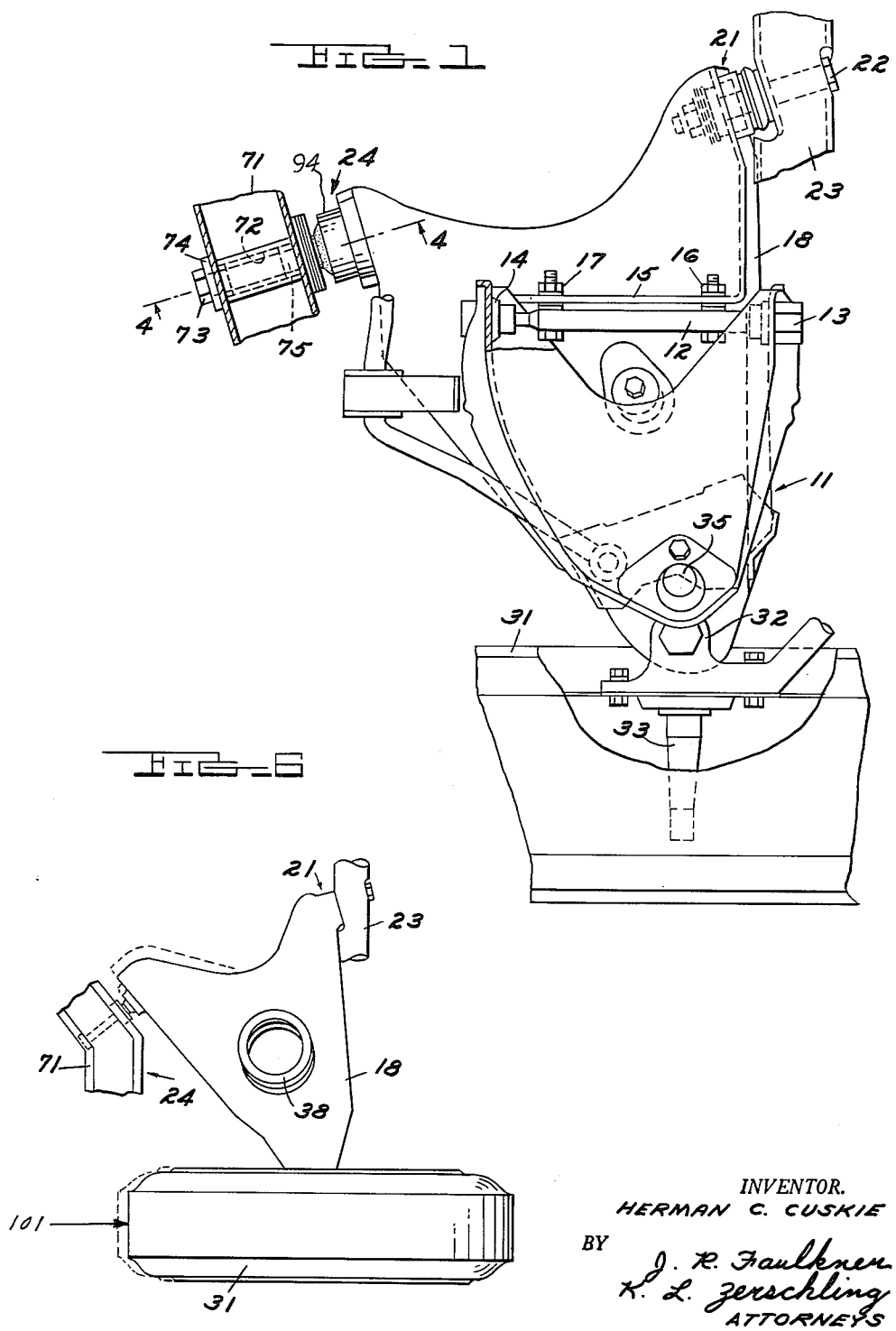

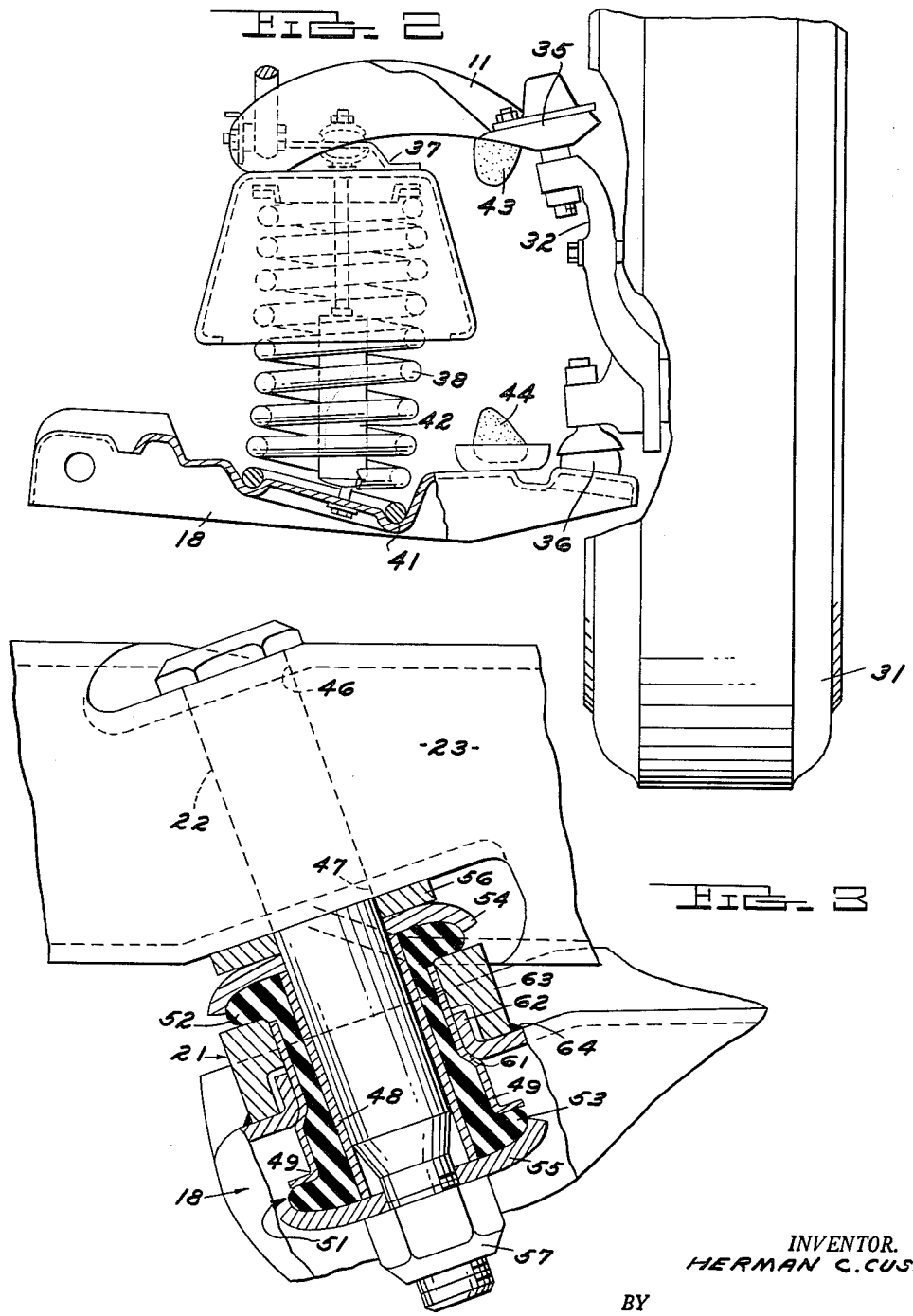

INVENTOR.
HERMAN C. CUSKIE
BY
J. R. Faulkner
K. L. Zerschling
ATTORNEYS under # United States Patent Office 3,111,307
Patented Nov. 19, 1963

3,111,307
INDEPENDENT SUSPENSION SYSTEM
Herman C. Cuskie, Birmingham, Mich., assignor to Ford Motor Company, Dearborn, Mich., a corporation of Delaware
Filed Nov. 21, 1960, Ser. No. 70,702
10 Claims. (Cl. 267—20)

This invention relates to an independent suspension system for a road wheel of an automotive vehicle and more particularly to such an independent suspension system that reduces harshness by permitting a limited amount of wheel recession against the force of a spring means that supports the sprung weight of the vehicle.

In conventional automotive vehicles, spring means are provided between the frame of the vehicle and the road wheels in order to absorb vertical movement of the road wheels and to prevent these movements from being transferred to the passengers of the vehicle. These spring means, however, function to absorb bumps and shocks applied to the wheels in a vertical direction only and do not function, nor are they constructed, to prevent the transfer to the vehicle passengers of horizontal loads and shocks applied to the road wheels. The term harshness is applied by those skilled in the art to the shocks and vibrations transmitted directly from the road wheels to the frame and body of the vehicle by loads and shocks applied to the road wheels, including horizontal loads and shocks.

This harshness may be substantially reduced by permitting a limited amount of wheel recession when the wheel encounters an object that transmits a horizontal force to the wheel. An example of this type of object is a tar strip between concrete slabs in a paved roadway or tar strips employed to repair cracks in a concrete roadway.

In certain known prior art devices, wheel recession is permitted by providing a vertical pin about which the wheel may pivot and by providing rubber buffers that resist the recession of the wheel and return the wheel to its normal position when the horizointal force is removed. Other prior art devices that permit wheel recession rely upon the compression and expansion of rubber bushings that connect the suspension arms to the frame of the vehicle. These devices, while permitting wheel recession, suffer from the disadvantage that steering control may be adversely affected by the low spring rate of the rubber employed, particularly when deterioration sets in because of wear and age.

The present invention eliminates these disadvantages and provides a suspension system for an automotive vehicle in which wheel recession is permitted against the force of spring means that spring the weight of the vehicle. This is accomplished by means that couple a suspension arm to a support member of the automotive vehicle.

In the preferred embodiment of the invention, a suspension arm is pivotally supported at a pair of spaced locations from a support member or frame of an automotive vehicle. A road wheel is rotatably supported by the suspension arm and a spring means is positioned in engagement with the suspension arm for springing a portion of the sprung weight of the vehicle. At one of the spaced locations a resilient means is provided while at the other location a cam and follower assembly couples the suspension arm to the support member. This cam and follower assembly is constructed and arranged to permit that portion of the suspension arm positioned adjacent thereto to move transversely of the vehicle and upwardly against the force of the spring means. This in turn permits recession of the wheel against the force of the spring means. This construction also provides an anti-dive feature when applied to the front wheels of an automotive vehicle since during braking horizontal forces are applied to the wheels. These horizontal forces will move a portion of the suspension arm upwardly against the force of the spring means as previously explained thereby resisting the tendency of the front end of the vehicle to move downwardly during braking.

The present invention thus provides for wheel recession against the force of the spring means normally employed to spring the weight of the vehicle and for the return of the wheel to its normal position by the force of this spring means. This eliminates the necessity for employing rubber bushings or buffers for performing this function and also eliminates the attendant disadvantages of such bushings and buffers. Also, by locating the means for permitting wheel recession, against the force of the spring means, at one of the locations where the suspension arm is pivotally supported to a support member or frame, a simple, inexpensive and effective means for reducing harshness is provided.

An object of the present invention is the provision of means for reducing harshness and for providing an anti-dive feature in an automotive vehicle.

A further object of the invention is the provision of a means for permitting recession of a road wheel of an automotive vehicle.

Another object of the invention is the provision of a means for permitting recession of a road wheel of an automotive vehicle against the force of spring means employed to spring the weight of the vehicle.

Still another object of the invention is the provision of a means that permits recession of a road wheel of an automotive vehicle and that simultaneously provides proper vertical support for a suspension member that carries the road wheel.

Other objects and attendant advantages of the present invention will become more readily apparent as the specification is considered in connection with the attached drawings in which:

FIGURE 1 is a plan view of the suspension system of the present invention;

FIGURE 2 is a sectional view partially in elevation of the suspension system shown in FIGURE 1;

FIGURE 3 is an enlarged section view partially in elevation of the pivotal connection, at one location, of the lower suspension arm to a support member or frame;

FIGURE 6 is a schematic view illustrating how wheel recession occurs in the present invention.

Figure 4:
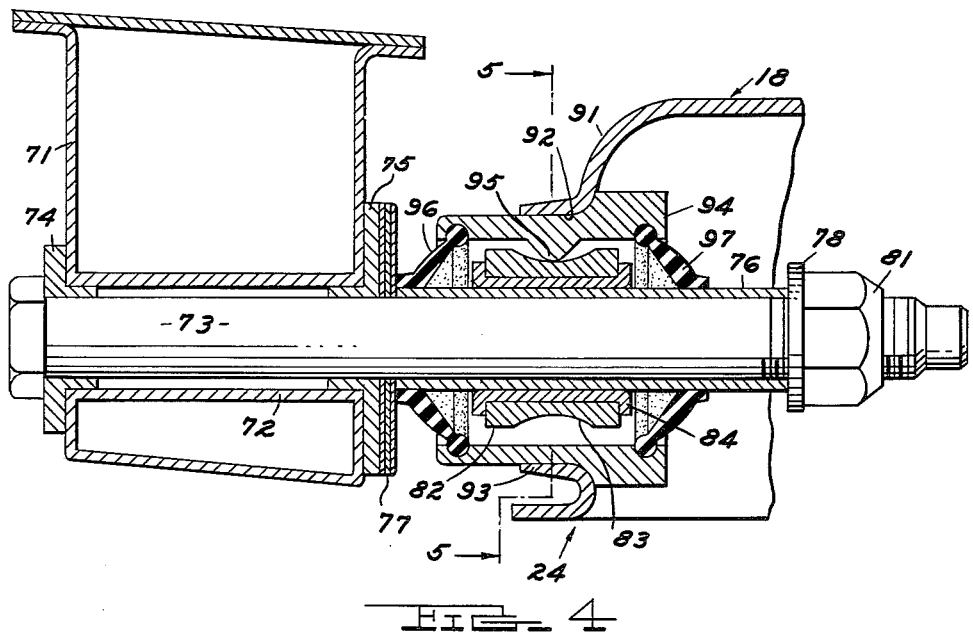
FIGURE 4 is an enlarged sectional view taken along the lines 4—4 of FIGURE 1.

Referring now to the drawings in which like reference numerals designate like parts throughout the several views thereof, there is shown in FIGURES 1 and 2 an independent suspension system for a road wheel of an automotive vehicle with which the present invention may readily be employed.

This suspension system comprises an upper suspension member, preferably a suspension arm 11, pivotally mounted on a shaft 12 at a pair of spaced locations by means of bushing assemblies generally designated by the numerals 13 and 14. The shaft 12 is arranged generally parallel to the center line of the automotive vehicle to which it is mounted and is attached to a longitudinal parallel extending frame member 15 by a pair of nut and bolt assemblies 16 and 17.

A lower suspension member, preferably a suspension arm 18, is also pivotally mounted at a pair of spaced locations to support or frame members of the automotive vehicle. This is accomplished by a conventional resilient bushing assembly generally designated by the numeral 21 which includes a bolt member 22 that passes through apertures in a frame cross-member 23, as will be described in greater detail subsequently.

The lower suspension arm 18 is also pivotally supported by means of another pivotal mechanism generally designated by the numeral 24 that is spaced from the bushing assembly 21 and that is preferably located along the axis of this bushing assembly. A road wheel 31 is rotatably supported on a wheel support member 32 that includes spindle 33. The wheel support member 32 is connected to the upper suspension arm 11 by means of a universal type connector 35 which may take the form of a conventional ball joint. The wheel support member 32 is also connected to the lower suspension arm 18 by another universal type connector 36 which may also take the form of a conventional ball joint.

A spring means is positioned between the lower suspension arm 18 and a structural member of the automotive vehicle, preferably a portion of the frame, as shown at 37. This spring means may take the form of a helical spring 38 that has one end positioned in an annular depression 41 in the lower suspension arm. The other end of the helical spring 38 engages the frame member 37. A conventional shock absorber 42 may be positioned between the lower suspension arm 18 and the frame member 37 in accordance with conventional suspension system practice. The upper and lower suspension arms may also be provided with a pair of rubber stop members 43 and 44 which limit the movement of the upper and lower suspension arms during jounce and rebound by coming into engagement with a portion of the frame member 37.

The independent suspension system for a road wheel as described above provides for the vertical movement of the wheel caused by vertical forces that are brought about by bumps and depressions in a roadway. The spring member 38 in conjunction with the upper and lower suspension arms prevents the transfer of the vertical movement of the wheel to the frame and body of the vehicle. The present invention also provides for the recession of the wheel 31 against the force of spring member 38 when horizontal forces are applied to the wheel by irregularities in the roadway. The recession of the wheel substantially reduces the transfer of horizontal loads and shocks to the body of the vehicle thereby substantially reducing harshness, as previously described.

Figure 5:
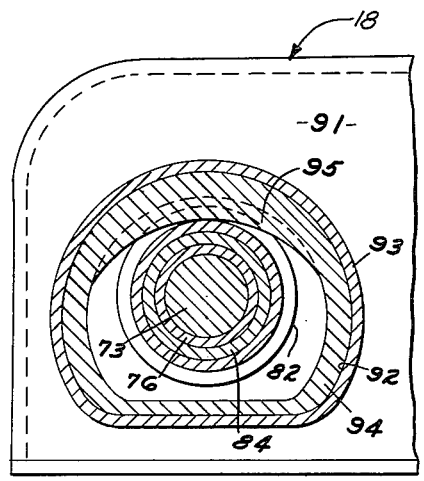
FIGURE 5 is a sectional view taken along the lines 5—5 of FIGURE 4.

The mechanism for accomplishing wheel recession against the force of the spring means is shown in detail in FIGURES 3 through 5. This mechanism is coupled to the support member or frame of the vehicle and to the lower suspension arm 18, and it permits the recession of the wheel 31 against the bias or force of the spring member 38. Referring now to FIGURE 3 which discloses the resilient bushing assembly 21 in detail, it can be seen that the suspension arm 18 is pivotally supported from the frame or support member 23 through the bushing assembly 21. As shown here, the frame member 23 is provided with a pair of aligned apertures 46 and 47 shown in outline form by the dotted lines. The bolt member 22 passes through these aligned apertures and receives the resilient bushing assembly 21.

The resilient bushing assembly 21 includes an inner metallic sleeve 48 that fits over the bolt 22, an outer metallic sleeve 49 and an intermediate resilient member 51 which may be constructed of a suitable elastomer, such as synthetic rubber. This intermediate member 51 is bonded to both inner sleeve 48 and outer sleeve 49. The intermediate resilient member 51 is provided with enlarged end portions 52 and 53 and caps 54 and 55 are positioned over the bolt 22 in engagement with enlarged end portions 52 and 53 respectively. A washer 56 is positioned over the bolt between the cap 54 and the support or frame member 23. A nut 57 is provided to engage the end of bolt 22 and when this nut is tightened it compresses the inner sleeve member 48 between the caps 54 and 55 to prevent relative rotation between this inner sleeve and the bolt 22.

The suspension arm 18 is provided with an aperture 61 and an axial flange 62 positioned about the periphery of the aperture. A ring member 63 is welded to the suspension arm as shown at 64, and both the ring member 63 and the flange 62 are suitably affixed, for example, by press fitting or welding, to the outer sleeve member 49.

FIGURES 4 and 5 show the pivotal connection 24 between a support member or frame and another portion of the lower suspension arm 18 that is preferably spaced in a direction toward the front of the vehicle with respect to the resilient bushing assembly 21 and the other structure shown in FIGURE 3. This pivotal connection comprises a cam and follower arrangement with the cam positioned on either the support member or the suspension member or arm 18 and with the follower, which preferably takes the form of a roller, positioned on the other member and in engagement with the cam.

In the preferred embodiment of the invention shown in FIGURES 4 and 5 the cam is positioned on the suspension arm and the follower or roller is positioned on the support member. Referring now to FIGURE 4 there is shown a frame member 71 having a cylindrical opening 72 positioned therein. A pivot pin or bolt 73 extends through the cylindrical opening 72 and engages the frame member 71 through sleeve members 74 and 75. The pivot pin or bolt 73 has a sleeve 76 positioned thereover that engages, at one end, a plurality of washers 77 positioned against the sleeve 75 and that engages, at the other end, a washer 78. A nut 81 is threadingly received on the end of the pivot pin or bolt 73 to clamp the sleeve member 76 between the washers 77 and 78 and to clamp the sleeve member to the pivot pin or bolt 73. The nut also secures the pivot pin or bolt to the support member 71. A roller 82, preferably having a central peripheral groove, as shown at 83, it rotatably mounted upon the sleeve 76 by means of a sleeve bearing 84. This sleeve bearing is preferably constructed so that sliding movement of the roller upon the sleeve may taken place in an axial direction of the pivot pin or bolt.

The suspension member or arm 18 includes a depending portion generally designated by the numeral 91. The depending portion 91 has an aperture 92 positioned therein, and an axially extending flange 93 is provided about the periphery of the aperture. A cam supporting sleeve 94 is positioned within the aperture 92 and is suitably affixed to the axially extending flange 93 by means of press fitting or welding. The cam supporting sleeve 94 has a cam surface 95 that rides in the peripheral groove 83 of the roller 82. This cam surface is preferably arcuate in configuration and has a radius substantially in excess of the radius of the portion of the roller that it engages. Also, as shown in FIGURE 5, the center of the arcuate cam surface 95 is positioned below the center of the roller 82. A pair of rubber seals 96 and 97 are positioned over the sleeve 76 and are fitted within internal grooves in the cam supporting sleeve 94 to exclude foreign matter from the bearing 84.

In the preferred embodiment of the invention as illustrated in the drawings, the pivot pin or bolt 73 is located along the axes of the resilient bushing 21 and the bolt 22 and is preferably positioned forwardly in the vehicle of this structure. Although the drawings disclose the roller 83 supported by the support member or frame 71 and the cam surface 95 supported by the suspension arm 18, it is within the purview of the invention to mount the cam surface upon the support member 71 and to mount the roller upon the suspension arm or member 18. In this case, the cam surface 95 would be located below the roller and would have a center positioned above the center of the roller. Similarly, although the drawings disclose the cam and follower arrangement to be located forwardly of the resilient bushing assembly 21, it is within the purview of the invention to mount the resilient bushing assembly 21 at the forward end of the suspension arm 18 and to mount the cam and follower arrangement at the rear of the suspension arm. It will be readily apparent to those skilled in the art that the preferred embodiment of the invention, as illustrated in the drawings, and those discussed above will operate equally well and in the same manner.

During normal jounce and rebound of the road wheel 31 the suspension arm may pivot about the aligned axes of the resilient bushing assembly 21 and the pivot pin 73 and roller 82. This pivotal movement takes place through the torsional deformation of the intermediate resilient member 51 of the bushing assembly 21 and by either rolling of the roller 82 on the cam surface 95 or by the rotation of the roller 82 and bearing 84 upon the sleeve 76, or by the combination of these actions.

When the road wheel 31 encounters a longitudinal horizontal force, the mechanism described above permits the portion of the suspension arm affixed to the cam surface 95 to move transversely outwardly toward the wheel and upwardly against the force of the spring member 38. As this longitudinal horizontal force is applied to the wheel it can be readily understood, from an inspection of FIGURES 4 through 6, that the portion of the suspension arm affixed to the cam surface 95 is lifted against the force of spring 38 since the came surface 95 moves rightwardly as viewed in FIGURE 5 with respect to the roller 82 and the roller is affixed to the support member 71. This movement is also a pivotal movement in a substantially horizontal plane about the resilient bushing member 21 and is permitted by the deformation of the intermediate resilient member 51. This results in a rearward movement of the road wheel 31 as shown in FIGURE 6.

As shown in FIGURE 6, when a horizontal longitudinal force designated by the arrow 101, is applied to the road wheel, the suspension arm 18 and the road wheel 31 move into a position shown in the solid lines. When the force 101 is removed the suspension arm and the wheel will move into the normal position as shown in the dotted lines since the cam and roller assembly will return to its equilibrium position in which the roller engages the highest portion of the cam surface. This normal position is shown in FIGURE 5.

The invention also provides an anti-dive feature during braking operations. During braking operations the forces applied to the road wheels due to the friction between the wheels and the road surface will be in a direction as shown by the arrow 101. As explained previously, this horizontal force applied to the wheel moves the suspension arm 18 upwardly by reason of the outward movement of the cam surface 95 relative to the roller 82. Thus, with this type of suspension system placed on the two front wheels of a vehicle, an upward force is applied to the spring members 38 during braking operations so that the tendency of the front end of the vehicle to lower during deceleration is substantially reduced.

Although this invention has been described in relation to a vehicle having a spring means connected to a lower suspension arm, it is equally applicable to suspension systems having a spring means connected to an upper suspension arm. In this case the resilient bushing assembly and the cam and follower assembly described would be employed to couple the upper suspension arm to the support members of the vehicle. It will be understood that the invention may be employed with any suitable spring means, for example, torsion bars and leaf springs as well as the helical spring illustrated in FIGURES 2 and 6.

The invention has been described in relation to an automotive vehicle having a separate frame structure, however, it is not intended to be limited to an automotive vehicle having such a structure. It can be suitably employed with vehicles having unitized bodies or with tractor-like vehicles in which the body is mounted directly upon the engine and drive-line components. The term "frame" when used in the specification and claims is meant to include any structural member of any automotive vehicle to which a suspension system may be coupled.

It can be appreciated that the present invention provides a simple and inexpensive means for reducing harshness in an automotive vehicle by permitting wheel recession. This means can be placed in a conventional suspension system with a minimum amount of modification and hence provides a suspension system for permitting wheel recession that can economically be employed in production.

It will be understood that the invention is not to be limited to the exact construction shown and described, and that various changes and modifications may be made without departing from the spirit and scope of the invention as defined in the appended claims.

I claim:

1. A suspension system for an automotive vehicle that reduces harshness by permitting recession of a road wheel comprising a support member, a road wheel, a suspension member rotatably supporting said road wheel, spring means engaging said suspension member for springing a portion of the weight of the vehicle, a resilient bushing coupling said suspension member to said support member at one location on said suspension member, a cam connected to one of said members, said cam having a curved surface, a follower connected to the other of said members and engaging the curved surface of said cam, said cam and follower being positioned at a location spaced from said resilient bushing and substantially along the axis thereof, the axis of said resilient bushing having a substantial directional component along the longitudinal axis of the vehicle, the curved surface of said cam being disposed in a plane that is substantially perpendicular to the axis of said resilient bushing and being disposed to provide vertical displacement between said cam and said follower as said follower moves over said curved surface.

2. A suspension system for an automotive vehicle that reduces harshness by permitting recession of a road wheel comprising, a support member, a road wheel, a suspension arm rotatably supporting said road wheel, spring means engaging said suspension arm for springing a portion of the weight of said vehicle, a resilient bushing assembly pivotally coupling said suspension arm to said support member at one location on said suspension arm, a pin affixed to said support member at a position spaced from said resilient bushing assembly, said pin being positioned on the axis of said resilient bushing assembly, a roller rotatably and slidably mounted upon said pin, an arcuate cam supported by said suspension arm in engagement with said roller, said arcuate cam having a radius greater than the radius of said roller with the center thereof being positioned below the center of said roller.

3. The combination of claim 2 in which said roller has a central groove for receiving said arcuate cam.

4. In an automotive vehicle the combination comprising, a support member, a road wheel, a suspension arm rotatably supporting said road wheel, spring means engaging said suspension arm for springing a portion of the weight of the vehicle, means coupling said suspension arm to said support member at one location on said suspension arm, a cam and follower coupling said suspension arm to said support member at a location spaced from said last mentioned means, said cam having a curved surface, said follower engaging said curved surface, said curved surface being disposed to provide vertical displacement between said cam and said follower as said follower moves over said curved surface.

5. In an automotive vehicle the combination comprising a support member that carries a portion of the weight of the vehicle, a road wheel, a suspension member rotatably supporting said road wheel, spring means engaging said suspension member for springing a portion of the weight of the vehicle, a resilient bushing assembly pivotally coupling said suspension member to said support member at one location on said suspension member, a roller connected to one of said members at a location spaced from said resilient bushing assembly, and a cam connected to the other of said members and engaging said roller for coupling said suspension member to said support member at said location spaced from said resilient bushing assembly, said cam having a curved surface, the center of curvature of said curved surface being vertically displaced from said cam and roller to provide a cam and follower in which vertical displacement takes place between said cam and said follower upon movement of said cam relative to said follower.

6. In an automotive vehicle the combination comprising a support member that carries a portion of the weight of the vehicle, a road wheel, a suspension arm rotatably supporting said road wheel, spring means engaging said suspension arm for springing a portion of the weight of the vehicle, a resilient bushing assembly pivotally coupling said suspension arm to said support member at one location on said suspension arm, a roller supported by said support member at a location spaced from said resilient bushing assembly, and an arcuate cam connected to said suspension arm, said arcuate cam being supported by said roller whereby the portion of said suspension arm connected to said arcuate cam is supported by said support member through said roller at a position spaced from said resilient bushing assembly, said arcuate cam having a radius greater than the radius of said follower with the center of the arcuate cam being positioned below the center of said roller.

7. In an automotive vehicle the combination comprising a support member, a road wheel, a suspension arm rotatably supporting said road wheel, spring means engaging said suspension arm for springing a portion of the weight of the vehicle, a resilient bushing assembly pivotally coupling said suspension arm to said support member at one location on said suspension arm, a cam and roller assembly pivotally coupling said suspension arm to said support member at a location spaced from said resilient bushing assembly, said cam and roller assembly being positioned substantially on the axis of said resilient bushing assembly, said wheel being located on said suspension arm substantially outboard of said axis, said cam and roller assembly being constructed and arranged to permit the portion of the suspension arm positioned adjacent thereto to move substantially transversely of the centerline of the vehicle and upwardly against the force of the spring means when a longitudinal force is applied to the forward portion of said wheel whereby wheel recession is permitted against the force of said spring means.

8. In an automotive vehicle the combination comprising a frame, a road wheel, a suspension arm supporting said road wheel, means pivotally supporting said suspension arm from a pair of spaced locations for jounce and rebound movement of said road wheel relative to said frame, said means including a cam and follower device interposed between said suspension arm and said frame at one of said locations and adapted to cause the portion of said suspension arm positioned adjacent said one location to traverse a horizontal path in response to a longitudinal force upon said wheel about the other of said locations as a center.

9. In an automotive vehicle the combination comprising a road wheel, a support member, a suspension arm, means for rotatably supporting said road wheel from said suspension arm, mutually independent means for pivotally supporting said suspension arm from said support member at a pair of spaced locations on said support member to permit relative vertical movement between said wheel and said support member, spring means affixed to said suspension arm and to said support member, said second mentioned means including a cam and follower device interposed between said arm and said support member at one of said spaced locations, said device being adapted to move said arm both laterally and vertically relative to said support member against the vertical loading of said spring means in response to a longitudinal force upon said wheel.

10. In an automotive vehicle the combination comprising a frame, a road wheel, a suspension arm supporting said road wheel, mutually independent means pivotally supporting said suspension arm from a pair of spaced locations for jounce and rebound movement of said road wheel relative to said frame, said means including a cam and follower device interposed between said suspension arm and said frame at one of said spaced locations, said device being adapted to cause the portion of said suspension arm adjacent said device to traverse a vertical and transverse path in response to a longitudinal force upon said wheel.

References Cited in the file of this patent

UNITED STATES PATENTS

| | | |
|---|---|---|
| 1,473,343 | Haines | Nov. 6, 1923 |
| 2,094,824 | Sanford | Oct. 5, 1937 |
| 2,191,942 | Rossman et al. | Feb. 27, 1940 |
| 2,372,744 | Sherman | Apr. 3, 1945 |
| 2,497,252 | Adams | Feb. 14, 1950 |
| 2,972,489 | Collier et al. | Feb. 21, 1961 |